United States Patent
Simon (10) Patent No.: US 8,049,723 B2
(45) Date of Patent: Nov. 1, 2011

(54) WIRELESS HANDHELD DEVICE AND METHOD WITH REMOTE GUI CONTROL

(75) Inventor: Peter L. Simon, New York, NY (US)

(73) Assignee: Accenture Global Services Limited, Dublin (IE)

( * ) Notice: Subject to any disclaimer, the term of this patent is extended or adjusted under 35 U.S.C. 154(b) by 907 days.

(21) Appl. No.: 11/306,229

(22) Filed: Dec. 20, 2005

(65) Prior Publication Data

US 2007/0139373 A1    Jun. 21, 2007

(51) Int. Cl.
*G06F 3/033* (2006.01)
*H04B 1/38* (2006.01)

(52) U.S. Cl. ......................................... 345/163; 455/566

(58) Field of Classification Search .......... 345/163–166; 455/41.2, 550.1–566
See application file for complete search history.

(56) References Cited

U.S. PATENT DOCUMENTS

| | | | |
|---|---|---|---|
| 5,724,106 A * | 3/1998 | Autry et al. ................... | 348/734 |
| 6,288,704 B1 | 9/2001 | Flack et al. | |
| 6,693,586 B1 | 2/2004 | Watlers et al. | |
| 6,909,906 B1 * | 6/2005 | Miyashita .................. | 455/550.1 |
| 2003/0006998 A1 | 1/2003 | Kumar | |
| 2003/0117376 A1 | 6/2003 | Ghulam | |
| 2005/0007343 A1 * | 1/2005 | Butzer .......................... | 345/163 |
| 2005/0068304 A1 | 3/2005 | Lewis et al. | |
| 2006/0079276 A1 * | 4/2006 | Indik et al. ................. | 455/556.1 |
| 2006/0132431 A1 * | 6/2006 | Eliezer et al. ................ | 345/156 |

FOREIGN PATENT DOCUMENTS

| | | |
|---|---|---|
| EP | 1376319 A | 1/2004 |
| EP | 1376319 A1 | 1/2004 |
| EP | 1507196 A | 2/2005 |
| EP | 1507196 A2 | 2/2005 |
| WO | 0143473 A | 6/2001 |
| WO | WO 01/43473 A1 | 6/2001 |
| WO | 03060816 A1 | 7/2003 |

OTHER PUBLICATIONS

European Patent Office International Search Report for International Application No. PCT/EP2006/012239 dated Apr. 4, 2007.
Canadian Official Action issued in Canadian Application No. 2,634,347 on Jan. 12, 2011.
Canadian Official Action issued in Canadian Application No. 2,634,347 on Mar. 1, 2011.
International Search Report issued in PCT/EP2006/012239 on Apr. 4, 2007.
Official Action in European Application No. 06829729.0 on Apr. 4, 2011.

* cited by examiner

*Primary Examiner* — Amr Awad
*Assistant Examiner* — Jonathan Boyd
(74) *Attorney, Agent, or Firm* — Vedder Price PC (57) ABSTRACT

A wireless handheld device is disclosed that includes a device housing, a wireless transmitter, such as a short range wireless transmitter, a local display and a housing motion detector that is operative to detect motion of the housing, for example, relative to a surface or other reference point, and outputs graphic user interface control information for transmission by the wireless transmitter to an external device. In one embodiment, a wireless pointing device is operably coupled with a wireless handheld device such as a cell phone or any other suitable wireless handheld device that includes a short range wireless transmitter and/or transceiver to remotely control operation of a graphic user interface for an external device. The housing motion detector utilizes the battery power of the wireless handheld device as its sole source of power or as an auxiliary source of power.

22 Claims, 4 Drawing Sheets

WIRELESS HANDHELD DEVICE AND METHOD WITH REMOTE GUI CONTROL

FIELD OF THE INVENTION

The invention relates generally to wireless pointing devices, such as wireless mice and more particularly to wireless handheld devices that use one or more wireless pointing devices to control a graphic user interface (GUI) on a display.

BACKGROUND OF THE INVENTION

Wireless mice are known which employ, for example, an optical or infrared sensor that senses movement of the wireless mouse on a surface, such as a table, and wirelessly communicates pointing device control information such as cursor location information or menu selection information to a short range wireless receiver in a laptop device or other device. Such wireless mice provide many advantages but can run out of battery power. The device may then be recharged through a USB port with the laptop device or through an AC wall socket or other suitable power source.

Wireless handheld devices such as cell phones and cell phones combined with other functions such as email and Internet access are also known (such as the Blackberry® type device or other suitable devices). Such devices employ a display for displaying information to a user and also employ a pointing device such as a mouse or track wheel which is used to control a graphic user interface such as controlling cursor movement and/or menu selection on a local display. Such devices may employ a pointing device such as a touch pad, tracking wheel, or other conventional mouse that detects the movement of a user's finger relative to a touch pad or movement of a tracking wheel relative to a fixed point in the housing of the handheld device. However, such local pointing devices do not typically control a GUI on a remote device.

It would be desirable to have a wireless pointing device that would couple with or be integrated with a wireless handheld device to receive additional battery power for the wireless pointing device and/or to provide GUI control of an external device to the handheld device.

SUMMARY OF THE INVENTION

Briefly, a wireless handheld device is disclosed that includes a device housing, a wireless transmitter, such as a short range wireless transmitter, a local display and a housing motion detector that is operative to detect motion of the housing, for example, relative to a surface or other reference point, and outputs graphic user interface control information (also referred to as a pointing device) for transmission by the wireless transmitter to an external device. In one embodiment, a housing structure of the housing motion detector is adapted to connect with a wireless handheld device such as a cell phone, email device, personal digital assistant, digital audio playing device, digital video playing device, or any other suitable wireless handheld device that includes a short range wireless transmitter and/or transceiver to remotely control a graphic user interface such as cursor (e.g. arrow or line) movement, menu identification, menu selection, icon selection or other known GUI operation for an external device. The housing motion detector in the structure utilizes the battery power of the wireless handheld device as its sole source of power or as an auxiliary source of power.

In another embodiment, a wireless cell phone is integrated with a housing motion detector and communicates graphic user interface control information such as cursor location information, menu/icon select information or other graphic user interface control information via a short range wireless transmitter to an external (i.e. remote) device such as a laptop computer, desktop computer, remote display, other wireless handheld device or any other suitable external device. In one embodiment, the movement of the cell phone (i.e. the housing) causes the wireless mouse to communicate graphic user interface control information for controlling a cursor and selection operations on a remote device that may include, for example, a display having a cursor thereon.

The housing motion detector may be integrated with the wireless handheld device or may be an attachment that may, for example, include a connector that couples with a device connector of the wireless handheld device to obtain battery power for the housing motion detector. The housing motion detector may be, for example, an optical (e.g. visible or infrared) wireless pointing device that may or may not include its own battery that also connects with a connector of the wireless handheld device to obtain battery power therefrom. As such, the wireless pointing device can transform a wireless handheld device such as a cell phone with a short range transmitter into a temporary wireless mouse for an external device. The housing of the cell phone also serves as a type of housing for the wireless mouse since it holds, or is attached to, the wireless pointing device. The housing motion detector may also be a non-infrared sensor (e.g. visible light or mechanical).

The housing motion detector may also include a structure that includes one or more select buttons so that wirelessly output graphic user interface control information can include select information to, for example, provide one click or two click select button operation. Additional keys may also be incorporated into the housing motion detector structure that may, for example, attach to a wireless handheld device. In an alternative embodiment, the wireless housing motion detector is incorporated within a wireless handheld device and keypad buttons or other buttons on the wireless handheld device are used as mouse control buttons for the housing motion detector to control a cursor control or menu selection in an external device.

A wireless external (i.e. remote) device includes a corresponding wireless short range receiver that receives the graphic user interface control information and controls a cursor/menu, icon or other GUI function that is visualized on a display such as one located in the wireless remote device, using the graphic user interface control information sent by the housing motion detector of the wireless handheld device. As such, among other advantages, a type of short range wireless enabled cell phone mouse or other device mouse allows a user to easily use their wireless handheld device as a mouse or GUI control device with any other short range wireless compatible external device such as a laptop or desktop computer or any other suitable device. Other advantages will be recognized by those of ordinary skill in the art.

A method is also disclosed that includes obtaining power for a wireless pointing device from a battery of a handheld device, detecting motion of the handheld device by the wireless pointing device and wirelessly transmitting graphic user interface control information to a device that is remote from the handheld device.

In another embodiment, a handheld device that already includes a wireless pointing device for its local display also includes a wireless pointing device and logic is included that allows the switching of the wireless handheld device from a remote mouse mode to a non-remote mouse mode to allow the handheld device to operate as a type of remote wireless mouse or to effectively disable the remote wireless mouse so that the device operates in a conventional mode. As used herein, "mouse" refers to a structure that provides GUI control information whether it be 2D or 3D cursor location information, menu location or highlighting information, menu or icon select information (e.g. one click or multi-click information) or any other suitable GUI control information.

BRIEF DESCRIPTION OF THE DRAWINGS

The present invention is illustrated by way of example and not limited in the accompanying Figures in which like reference numerals indicate similar elements and in which.

DETAILED DESCRIPTION OF THE INVENTION

Figure 1:
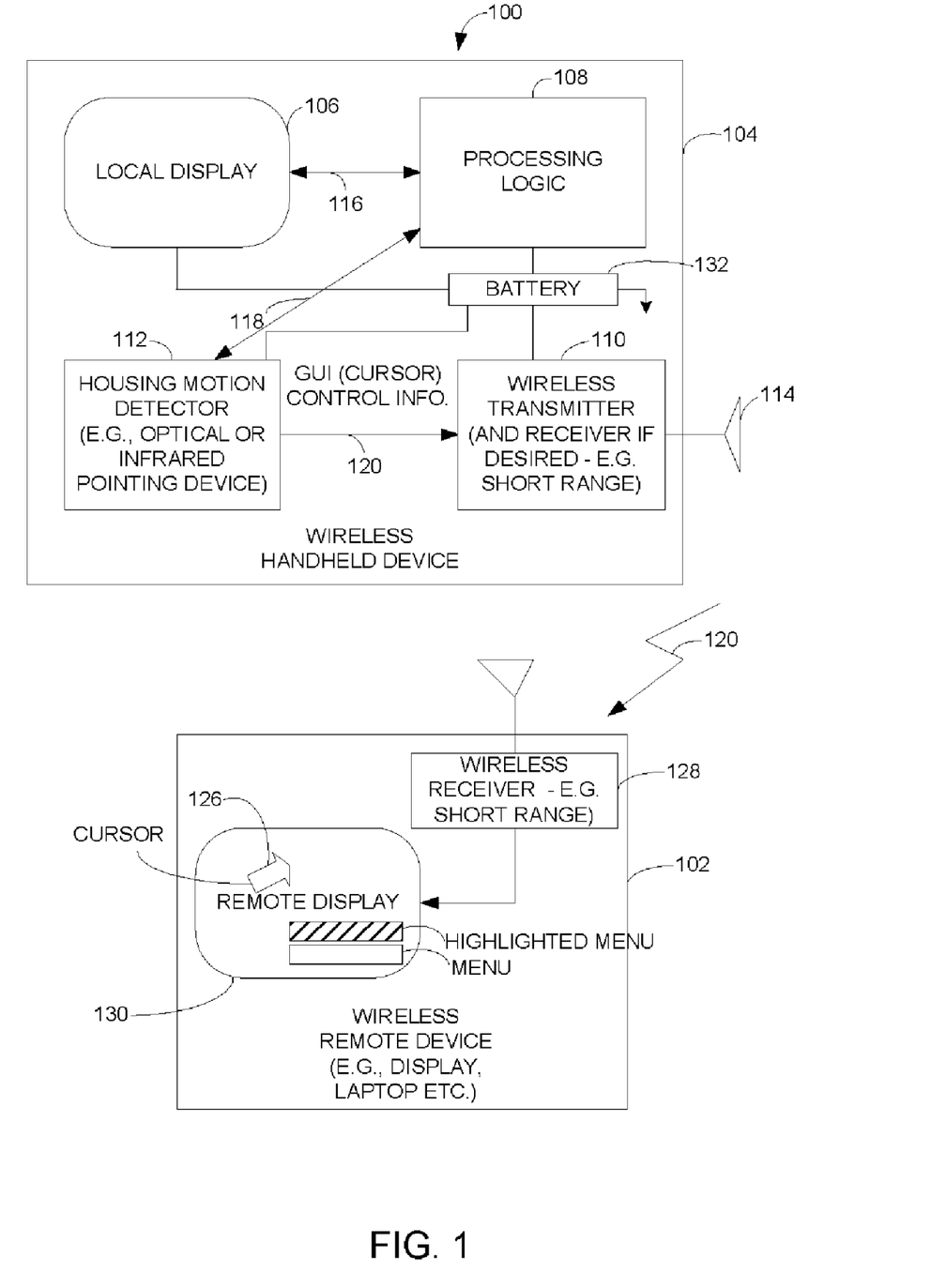
FIG. 1 is a block diagram illustrating one example of a wireless handheld device and a remote device wherein the wireless handheld device employs a device motion detector to control a GUI on the remote device in accordance with one embodiment of the invention.

FIG. 1 is a block diagram illustrating one example of a wireless handheld device 100 that is in wireless communication with an external device 102 through a short range wireless communication link. For purposes of illustration only, the short range wireless communication link will be described as being a short range link capable of ranges of between 0 and 100 meters and may, for example, incorporate technology such as IEEE 802.11 based technology also referred to as Bluetooth® technology, or any suitable radio frequency or optical short range communication link as desired. The wireless handheld device 100 may be any suitable wireless handheld device including, but not limited to, a wireless cell phone (clam shell housing or other configuration), a personal digital assistant, an Internet appliance that connects to the Internet, a digital audio playing device (such as an iPod® device), a digital video playing device (such as a device having a DVD player), an email communication device, or any other suitable combination thereof or any other suitable handheld wireless device having any suitable functionality. The wireless handheld device includes a housing 104 that includes therein or attached thereto, a local display 106, processing logic 108, a short range wireless transmitter 110, and a housing motion detector 112. For purposes of illustration only, the wireless transmitter 110 will be referred to as a Bluetooth® type wireless transmitter and includes an antenna 114, however it will be recognized that the wireless transmitter 110 may also be an infrared transmitter or any other suitable wireless transmitter. In addition, the term "transmitter" as used herein also, if desired, includes a receiver to provide bidirectional communication if desired. The components in the wireless handheld device are coupled to the housing in any conventional manner either directly or indirectly.

The processing logic 108 is operably coupled to the local display 106, the housing motion detector 112 and wireless transmitter 110, if desired, to provide suitable control information and display information. The wireless handheld device 100 also includes a battery 132 that supplies suitable power to power supply logic (not shown), to the housing motion detector 112 and other components within the wireless handheld device.

In this example, the processing logic 108 provides display information through a suitable communication link 116 that is displayed on the display as known in the art. The processing logic 108 may also provide control information, such as activation or deactivation information with the housing motion detector 112 through a suitable communication link 118. The processing logic 108 may be, for example, one or more digital processing devices such as a microprocessor, microcontroller, digital signal processor, or any other suitable logic including but not limited to, state machines, other processing devices that execute executable instructions that cause the processors to operate as described herein or discrete logic or any suitable combination of hardware, software and firmware. The processing logic 108 therefore may include single or multiple processing devices and/or discrete logic as desired or any suitable combination of hardware and software.

The housing motion detector 112 outputs conventional graphic user interface control information 120 for transmission by the wireless transmitter 110 to an external device such as wireless remote device 102. The housing motion detector 112 enables a user to move a pointer on a screen, scroll through items on a screen or provide other conventional GUI operations. The housing motion detector 112 may include, for example, a conventional optical or infrared detector, and corresponding processing circuitry found in conventional wireless mouse devices and is suitably coupled to the housing so that it detects motion relative to a surface or other reference point. The housing motion detector 112 may also include corresponding select buttons whether through a shared keypad, dedicated buttons or other selection mechanism depending upon whether the housing motion detector is attachable to or integrated with a handheld device. The graphic user interface control information 120 may include any information for controlling a graphic user interface such as, but not limited to, display screen menu highlighting, selection operations or any other suitable GUI control operations as known in the art. For example, external devices that do not employ a conventional cursor, such as an arrow, may simply employ a menu based GUI that highlights a menu or icon that may be selected by a user, if desired. As such, the graphic user interface control information 120 includes any information that allows a user to navigate through a graphic user interface to make suitable selections on the remote device. As such, in this example, where a cursor 126 is used by the GUI of the external device 102, the graphic user interface control information 120 would include location information to allow the movement of the cursor 126 as well as corresponding select information that corresponds, for example, to conventional single click or double clock operation to select a given operation identified through the user interface. Also, it will be recognized that the remote device 102, although shown herein as including a wireless receiver 128 to receive the sent graphic user interface control information 120, may simply be an intermediate device that does not include a remote display. Instead, the graphic user interface control information 120 is retransmitted by the intermediate device to a device having a remote display that displays the GUI. Moreover, for purposes of illustration only, in this embodiment the wireless remote device 102 may be, for example, a remote laptop computer with a display 130 and may also include the corresponding short range wireless receiver 128 capable of receiving the short range wirelessly transmitted graphic user interface control information 120 to control a visual pointer or the cursor 126 on the display 130 of the wireless remote device 102. The wireless remote device 102 may also be an HDTV display with a wireless receiver, projector or other display with a short range transmitter, or for example, a laptop computer or desktop computer. It will be recognized that the remote device 102 also includes other processing circuitry not shown to allow the wirelessly received graphic user interface control information 120 to be suitably processed to control the cursor 126 as known in the art.

Figure 2:
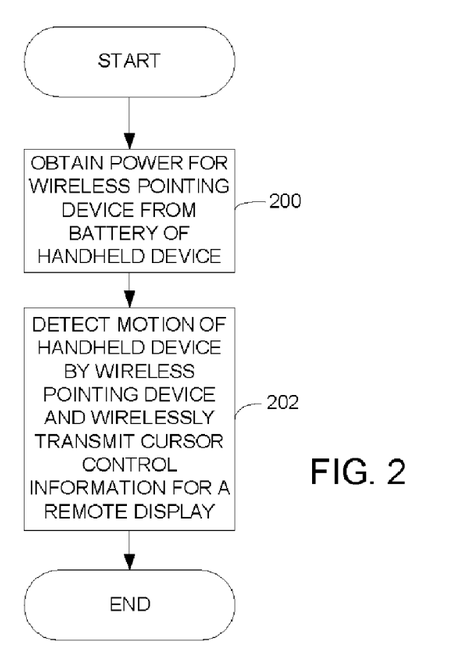
FIG. 2 is a flowchart illustrating one example of a method for providing display pointing information in accordance with one embodiment of the invention.

FIG. 2 is a flowchart illustrating one example of a method for providing graphic user interface control information for a remote device that may be carried out, for example, by the wireless handheld device 104 of FIG. 1, or any other suitable device. As shown in block 200, the method includes obtaining power for a housing motion detector from a battery of a handheld device. This may be done, for example, through a connector (as described later with respect to FIGS. 4-6) or through a wired connection within the wireless handheld device or through any other suitable mechanism. As shown in block 202, the method includes detecting motion of the handheld device by the housing motion detector and wirelessly transmitting graphic user interface control information 120 from the housing motion detector to a device that is remote from the handheld device. The graphics user interface control information 120 may include, for example as noted above, graphic user interface control information (e.g. x, y, z movement and button selection) and x, y movement of a cursor. For example, as the wireless handheld device 104 is moved across a flat surface, the housing motion detector 112 detects the movement of the housing relative to the flat surface and produces the graphic user interface control information 120 which is communicated to the wireless transmitter 110, through other circuitry if desired, for short range wireless transmission to a remote device. The remote device then receives the graphic user interface control information 120 and suitably controls the graphic user interface on the remote device such as the movement of a cursor, selection of an icon or menu on the display, highlighting of an icon or menu, activating a pull-down menu, or any other graphic user interface operations as known in the art. The housing motion detector 112 obtains its battery power from the battery that is also used to power, for example, the local display and/or other processing logic of the wireless handheld device 104.

Figure 3:
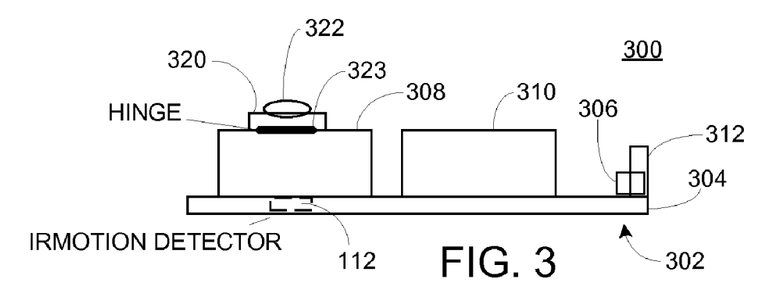
FIG. 3 is a side view of one example of a wireless pointing device in accordance with one embodiment of the disclosure.

FIG. 3 is a block diagram illustrating one example of a wireless pointing device 300 which is designed as a separate attachment device that attaches to a handheld device such as, but not limited to, a wireless handheld device, such as a cell phone, to effectively turn the cell phone into a wireless pointing device. The wireless pointing device 300 includes a structure 302 adapted to hold a handheld device therein. The structure 302 includes a motion detector, such as device motion detector 112 in a base portion thereof 304 and is operative to provide graphic user interface control information 120. The base portion 304 may be adapted, for example, to be flat to allow the motion detector 112 to detect motion with respect to a flat surface. The wireless pointing device 300 also includes a connector 306 adapted to engage electrically, and mechanically if desired, with a corresponding connector in a handheld device so that the pointing device 300 can obtain battery power from the handheld device.

Figure 4:
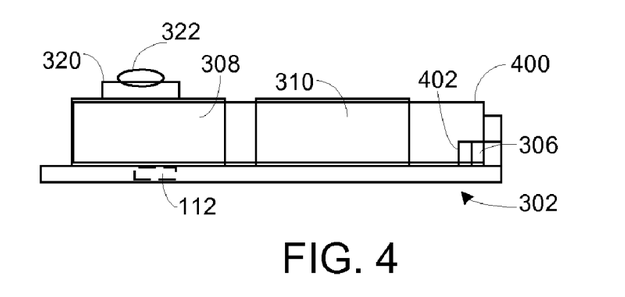
FIG. 4 is a side view illustration showing the wireless pointing device of FIG. 3 coupled to a wireless handheld device via a connector in accordance with one embodiment of the invention.

For example, as shown in FIG. 4, a handheld device 400 is shown connected to and supported by the pointing device 300. The handheld device 400 has a corresponding connector 402 which engages with the connector 306 of the structure 302 to provide electrical connections with the pointing device 300 which includes not only battery power, but also provides the communication link to provide the graphic user interface control information 120 from the pointing device 300 to the handheld device 400 so that the handheld device 400 can wirelessly transmit via its own short range wireless transmitter, the GUI control information 120 to another external device. Alternatively, the pointing device 300 may include a short range wireless transmitter built therein if, for example, the handheld device does not have a short range wireless transmitter. However, since many wireless handheld devices 400 already include Bluetooth® type short range transmitters, the pointing device 300 may take advantage of this existing hardware to reduce complexity and costs.

Figure 5:
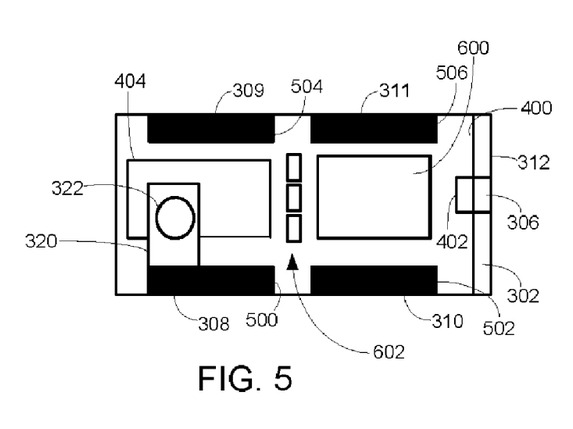
FIG. 5 is a plan view of one example of the device shown in FIG. 4.

Referring now to FIG. 3-FIG. 5, the example structure 302, in addition to the base portion 304 that contains the motion detector 112, also includes a plurality of sidewalls 308, 309, 310, 311 and an endwall 312 which may contain the connector 306. However, it will be recognized that the connector 306 may be located wherever it is suitable. The sidewalls are in operative connection with the base portion 304 and are adapted to engage with the handheld device 400. The sidewalls 308-311 in this example and endwall 312, may be integrally formed with the base portion 304. The base portion 304, sidewalls 308-311 and endwall 312 may be made from any suitable material such as plastic. However, it will be recognized that the walls may be snap fit, screwed into, glued, or fixed in any suitable fashion with the base. As used herein, engage simply means to hold in some manner. It will be recognized that the only mechanical mechanism necessary may be the connection between the connector 306 and connector 402, however the sidewalls 308, 310, 309 and 311 may provide any suitable amount of retention as desired. For example, the sidewalls 308-311 may be configured to frictionally engage with the handheld device 400 or there may be corresponding recesses in the handheld device and corresponding protrusions in the sidewalls 308-311 in order to mechanically engage the sidewalls with the device. However, it will be recognized that any suitable arrangement may be used and that any suitable design of the base, sidewalls and endwall may be used. It will also be recognized that depending on the design, no endwall may be necessary.

The structure 302 also includes a flip arm 320 which, in this example, is pivotal about a hinge mechanism 323 to allow the flip arm 320 to be flipped up to allow the handheld device 400 to be used in its normal mode so that the flip arm does not cover a screen 404 of the handheld device. The flip arm 320 also includes a select button 322 which serves as a select button found on conventional mouse devices to provide a one click, two click or multi-click select function. The selection button 322 provides GUI control information associated with the housing motion detector 112 to the handheld device 400 through the connector 306 and 402. More than one select button may also be provided on the flip arm if desired. It will also be recognized that any suitable pivot mechanism in any suitable pivot direction may also be employed if desired or that no pivot mechanism need be used if the handheld device can suitably slide into the pointing device 302.

Referring to FIG. 5, which is a plan view of the pointing device 300 holding a handheld device 400 therein, each of the sidewalls 308-311 include wall portions 500-506 that extend inwardly to retain the handheld device 400 in place. However, it will be recognized that only opposing sidewalls 308 and 309 or fewer than all sidewalls can include the inwardly extending portions 504 and that any other suitable arrangement may also be employed to suitably hold the handheld device 400 in proper position with the pointing device 300. Also, the length and type of the sidewalls may be any suitable length sufficient to hold the handheld device in proper connection with the pointing device 300. It will be recognized that the pointing device 300 may include its own battery or batteries and that the connector 306 can provide additional power when the onboard batteries are low, if desired.

Figure 6:
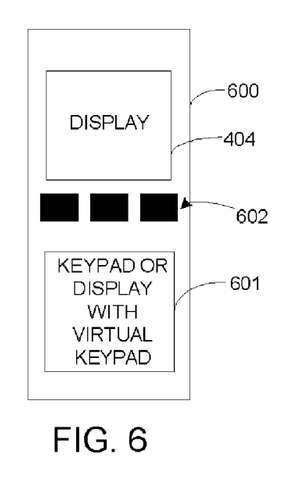
FIG. 6 is a plan view of one example of a handheld wireless device in accordance with one embodiment of the invention.
Figure 7:
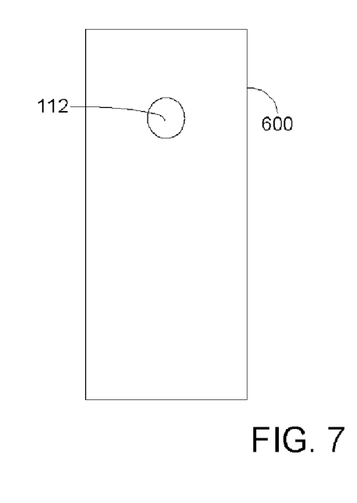
FIG. 7 is a bottom view of the device shown in FIG. 6.
Figure 8:
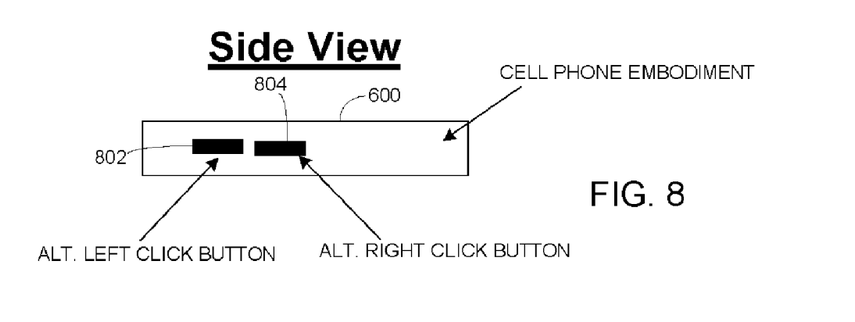
FIG. 8 is a side view of the device shown in FIG. 6.

FIGS. 6, 7 and 8 illustrate an alternative embodiment where a wireless handheld device employs the motion detector 112 as opposed to the arrangement shown in FIGS. 3-5 where a separate pointing device is configured as an attachment to a handheld device. In this example, in addition to conventional functions and user interface structure such as keypads, displays that act as virtual keypads, or any other suitable user interface mechanisms, a wireless handheld device 600, is shown in this example to be, for example, a cell phone with the housing motion detector 112 therein, and includes the display 404, a keypad 601 and additional control keys 602. As known in the art, these control keys 602 are normally used for various operations for the device and may be used to effect different functions, such as volume control, address book selection and other suitable functions. They may also be used as graphic user interface control buttons to allow, for example, the user to scroll up and scroll down and select items displayed on display 404. In one embodiment, either an existing control key 602 or an additional control key is used as a hot key that is operative to enable a user to switch between a mouse mode that transmits graphic user interface control information 120 provided by the housing motion detector 112 and a non-mouse mode which does not allow any wireless transmission of graphic user interface control information 120 to be transmitted. For example, a non-mouse mode may include a cell phone mode, a video play mode, an audio play mode, or any other suitable mode of operation of the device 600 that does not output graphic user interface control information 120 through the wireless transmitter 110.

As noted above, the control keys 602 may serve as GUI navigation buttons that are coupled to provide graphic user interface control information for the local display 404 as known in the art. However, in addition, the device 600 also employs the housing motion detector 112 to provide additional graphic user interface control information 120 for a remote device based on movement of the housing of the device 600. It will be recognized that the housing motion detector 112 may be suitably located on any portion of the device 600 including a movable portion in the case of a clam shell design or other design that employs moving parts of the device 600.

As shown in FIG. 8, the wireless handheld device 600 may also include GUI select buttons 802 and 804 that, in this example, serve as a part of the housing motion detector 112 to provide graphic user interface control information 120. As such, additional keys may be added if desired, to allow wireless mouse operation to be carried out by a user using the device 600. It will also be recognized that any buttons may be used on the device including buttons normally used for volume control, other control or other keypad buttons through suitable button activation and control operations as further described below.

Figure 9:
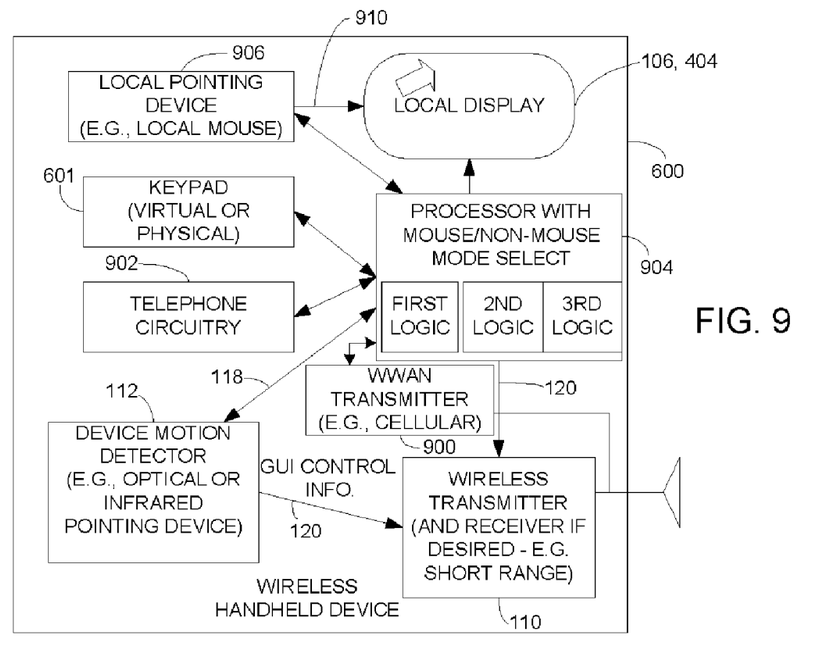
FIG. 9 is a block diagram illustrating another embodiment of a wireless handheld device in accordance with one aspect of the disclosure.

FIG. 9 is a block diagram of one example of the wireless device 600 which may be, for example, a wireless handheld device wherein it is considered wireless since it includes at least the short range wireless transmitter 110. However as described above, in this embodiment the wireless device 600 also includes a wireless wide area network transmitter 900 such as a CDMA, GSM, or any other suitable long range wireless transmitter to allow the wireless device to communicate voice and data information via various networks as known in the art. The device 600 in this example also includes wireless telephone circuitry 902 coupled to the wireless wide area network transmitter as known in the art (e.g., transceiver) such as through a processor 904 and is operatively coupled to logic such as the processor 904 that performs the operations such as those described with reference to the processing logic 108 and in addition may provide additional functions as described further below. The various functional elements shown are operatively coupled with the processor 904 through conventional communication links and are shown by the bidirectional arrows. In this example, in addition, the device 600 also includes a local pointing device 906 such as a track wheel, touch sensitive pointing device found, for example, on iPod® type digital audio players, or any other suitable local graphic user interface control mechanisms. The local pointing device 906 provides local graphic user interface control information 910 to the local display 404 which is used in a conventional manner as known in the art to allow a user to suitably navigate a graphic user interface of the device 600 to input information into the device and receive output information from the device. In this example, the keypad 601 is also operatively coupled to the telephone circuitry 902 through the processor 904, as known in the art, to allow the keypad to be used during wireless telephone operation. The keypad 601 is also operatively coupled to allow the processor 904 to generate the graphic user interface that is displayed on the local display so that keys associated with the keypad can be used to navigate through the graphic user interface using the local pointing device 906, as known in the art. The keys themselves may be used as part of the local pointing device to scroll through menus and move a pointer or the local pointing device may be a track wheel in combination with keys to effect pointer control (including selection). The local display 106 displays information to a user as known in the art.

The housing motion detector 112 is coupled to the short range wireless transmitter 110 and provides wireless graphic user interface control information 120 and determined based on movement of the wireless handheld device 600, such as relative to a surface or other suitable reference point and/or from select buttons. The GUI control information 120 is communicated by the wireless transmitter 110 for a remotely located device. Also if desired, the device motion detector 112 can also be used instead of, or in addition to, the local pointing device 906 to provide GUI information 118 to control the graphic user interface provided on the local display 106.

The processor 904 executes instructions stored in memory that when executed serves as logic operative to control keys of the keypad 601 to serve as control buttons for the device motion detector 112 so that the device motion detector 112 can provide, for example, select operations similar to those found on conventional mouse devices. In addition, the logic also controls keys of the keypad 601 for use to carry out wireless telephone operations as known in the art. Additional programming instructions stored in memory (not shown) and executed by the processor 904 also act as logic to switch control keys of the keypad from a wireless mouse mode to a non-mouse mode, such as a wireless telephone mode in response to detection of an incoming call. For example, the device 600 may be placed in a wireless mouse mode, such as through a user selecting a menu that activates the device motion detector 112 to generate and provide GUI control information 120 to the wireless transmitter 110. The mode may be switched in any other suitable manner and may be switched from use during this mode for use instead during a wireless telephone mode so that the control keys can instead by used to facilitate operations that are desired when and during an incoming call is received. Accordingly, the logic automatically switches control key functionality between control buttons for use with the device motion detection and for a telephone mode of operation.

Additional executable instructions stored in memory that when executed by the processor, makes the processor serve as logic also operative to display information indicating which keys of the keypad 601 are to be used for controlling the device motion detector 112 (display pointing device). As such, there may be text or other indicia displayed on the local display indicating which keys of the keypad 601 are to be used for controlling the device motion detector 112 to provide remote GUI control. It will be recognized that the executable instructions may be implemented in a single program, multiple programs or in any other suitable form. It will also be recognized that the device motion detector 112 as described may be an attachable display pointing device such as that described with reference to FIG. 3. The processor also includes display pointing device switching logic that is operative to switch between using the local pointing device 906 and the device motion detector (e.g. that includes corresponding selection buttons if desired) which serves as a remote display pointing device, based on whether the device 600 is in a remote mouse mode or a non-remote mouse mode. In a remote mouse mode, as selectable by a user through a hot key or other suitable selection mechanism, the wireless handheld device utilizes the device motion detector 112 and wireless transmitter 110 as described above to remotely control the graphic user interface of a remote device. In a non-remote mouse mode, the device 600 may operate to provide any other functionality such as a telephone, digital audio or video playing mode or any other suitable mode that uses the local pointing device to control the GUI on the local display.

Accordingly, among other advantages, a type of short range wireless enabled GUI control device such as a mouse or other pointing device allows a user to easily use their wireless handheld devices (e.g. cell phone) as a mouse or GUI control device with any other short range wireless compatible external device such as a laptop or desktop computer or any other suitable device. In one example, an attachable display pointing device obtains its power from another wireless device, such as a cell phone, digital audio player (such as an iPod® type device), a handheld digital video player, or any other suitable handheld device. Other advantages will be recognized by those of ordinary skill in the art.

The above detailed description of the present examples has been presented for the purposes of illustration and description only and not by limitation. It is therefore contemplated that the present application cover any additional modifications, variations, or equivalents but fall within the spirit and scope of the basic underlying principles disclosed above and the appended claims.

What is claimed is:

1. A wireless handheld device comprising:
    a device comprising a wireless transmitter, a battery, a device connector and a local display; and
    a housing structure adapted to hold the device and comprising a housing motion detector and a connector adapted to couple to the device connector, the housing motion detector operative to obtain power from the battery via the connector and the device connector, to detect motion of the device and to provide graphic user interface control information to the wireless transmitter via the connector and the device connector for transmission to an external device,
    wherein the housing structure further includes a flip arm comprising at least one select button operative to provide graphic user interface control information associated with the housing motion detector.

2. The wireless handheld device of claim 1, wherein the device further comprises wireless telephone circuitry.

3. The wireless handheld device of claim 1, the device further comprising a display pointing device operatively coupled to provide graphic user interface control information for the local display.

4. The wireless handheld device of claim 1 wherein the housing motion detector includes at least one of an infrared pointing device and a non-infrared pointing device.

5. The wireless handheld device of claim 1 wherein the housing structure comprises a base underlying said device and wherein said flip arm has a first position overlying said device and a second position flipped away from said device.

6. The wireless handheld device of claim 5 wherein the housing structure further includes a plurality of sidewalls having portions adapted to engage with the device.

7. The wireless handheld device of claim 6 wherein said flip arm is hinged to one of said plurality of side walls.

8. The wireless handheld device of claim 5 wherein said flip arm is located so as to overlie said local display when in said first position.

9. The wireless handheld device of claim 5 wherein said select button is positioned on said flip arm such that, when said flip arm is in said first position, said select button faces away from said local display.

10. The wireless handheld device of claim 1 wherein the housing structure further includes an endwall containing said connector.

11. The wireless handheld device of claim 1 including at least one hotkey operative to enable a user to switch between a mouse mode that transmits graphic user interface control information based on the housing motion detector and a non-mouse mode.

12. A method for providing graphic user interface control information comprising:
    obtaining power for a housing motion detector from a battery of a handheld device via a connector operatively coupled to the housing motion detector and to a device connector of the handheld device;
    detecting motion of the handheld device by the housing motion detector and activation of at least one select button on a flip arm of a housing structure supporting the housing motion detector to provide graphic user interface control information; and
    providing the graphic user interface control information from the housing motion detector to a wireless transmitter of the handheld device via the connector and the device connector for transmission of the graphic user interface control information to a device that is remote from the handheld device.

13. The method of claim 12 further comprising:
    switching between a mouse mode that transmits the graphic user interface control information and a non-mouse mode.

14. The method of claim 13 wherein the handheld device includes cell phone circuitry and wherein the non-mouse mode is a cell phone mode.

15. The method of claim 12 further comprising switching between a display pointing device located within the handheld device and the housing motion detector based on whether the handheld device is in a remote mouse mode or a non-remote mouse mode.

16. A pointing device comprising:
a housing structure adapted to hold a handheld device therein, the housing structure further comprising a motion detector operative to provide graphic user interface control information, a connector operative to electrically couple with a device connector of the handheld device to obtain battery power therefrom and to provide the graphic user interface control information to a wireless transmitter of the handheld device, and a flip arm having at least one select button operative to provide the graphic user interface control information.

17. The pointing device of claim 16 wherein the housing structure comprises a base for underlying said device and wherein said flip arm has a first position overlying said base and a second position flipped away from said base.

18. The pointing device of claim 17 wherein said select button is located on said flip arm such that when said flip arm is in said first position, said select button faces away from said base.

19. The pointing device of claim 17 wherein said base portion contains the motion detector and wherein the structure adapted to hold the handheld device further comprises: a plurality of sidewalls, in operative connection with the base portion, having portions adapted to engage with the handheld device.

20. The pointing device of claim 19 wherein the flip arm is hinged to one of said plurality of side walls.

21. The pointing device of claim 16 wherein the housing structure further includes an endwall and wherein said endwall contains said connector.

22. The pointing device of claim 16 wherein the housing motion detector includes at least one of an infrared pointing device and a non-infrared pointing device.

* * * * *